March 8, 1932.  F. PILLER, JR  1,848,802
PROCESS FOR MAKING MULTICOLOR COPYING SCREENS
Filed May 16, 1930
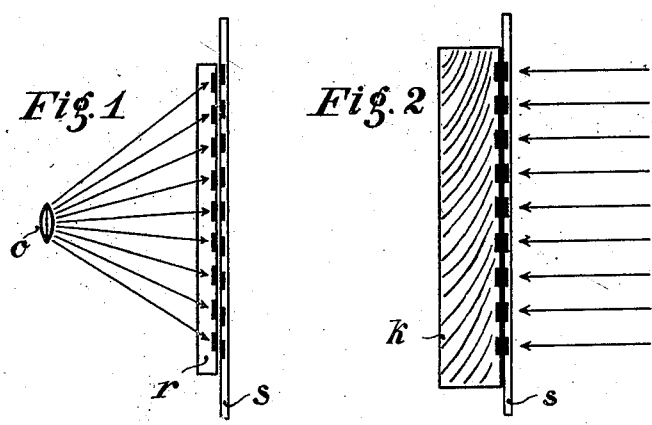
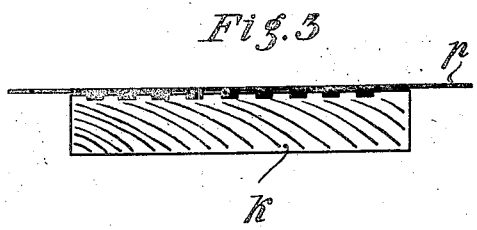
Inventor:
Franz Piller junior
by (signature)
Attorney Patented Mar. 8, 1932 1,848,802

UNITED STATES PATENT OFFICE

FRANZ PILLER, JR., OF MUNICH, GERMANY

PROCESS FOR MAKING MULTICOLOR COPYING SCREENS

Application filed May 16, 1930, Serial No. 452,862, and in Germany May 25, 1929.

In color photography with color screens the screen elements of the exposure screen are, as is generally known, distorted by the camera lens, for instance, in consequence of the dimunition of light, or in consequence of the space between the screen surface and the sensitive layer, both in their form as also in their relative position, resulting in a distorted screen picture on the negative. It follows that a perfect positive picture can only be produced if the distorted elements of the negative are contained in the same degree of distortion in the copying screen, in order to make a correct correspondence of the individual screen elements possible.

The present invention refers to a process for making polychromatic copying screens, in which a correct correspondence of the copying screen with the distorted negative is made possible by very simple means; in other words, the exact degree of distortion in the negative is reproduced in the copying screen. The process is adapted only for copying screens made up of uniform or regular elements, as, for instance, line screens, dot screens, check pattern screens.

In the accompanying drawings the individual phases of the process are shown with the help of the parts used in the process; for the sake of distinctness these parts and especially the individual screen elements are much enlarged and their distortion much exaggerated.

Fig. 1 shows the exposure of a photographic plate through a standard polychromatic screen using divergent light of a single color.

Fig. 2 shows the exposure of a cliché through the finished plate from Fig. 1, parallel rays of light being used.

Fig. 3 illustrates the printing of a new screen using the cliché or printing block from Fig. 2.

According to the new process, a sensitive layer on a transparent base $s$, for instance, a glass plate, is exposed behind a standard, for instance, engraved, polychromatic screen $r$ with the help of the lens $o$. Exposure is made in such manner, that of the several colors contained in the screen $r$, one color only, for instance, blue, is reproduced on the base $s$, which is attained by means of an exposure with blue light. The screen $r$ in front of the sensitive layer causes distortion, the degree of distortion depending on the focal length of the lens $o$; this distortion is clearly shown in Fig. 1, and consists for instance in a gradual widening of the intervals between the individual screen elements towards the edges of the plate or sensitive layer.

With the help of this distorted image on the plate $s$, a cliché or printing block, for instance, a zinc cliché $k$ is made, the distorted image being transferred from the plate to the cliché in known manner by chemical action with the help of parallel light rays, as shown in Fig. 2. This printing block $k$ is now used to print the polychromatic copying screen $p$ in such manner, that first only one color (blue) is printed, the distortion in the copying screen then obviously exactly corresponding with the distortion in the negative $s$. Hereupon the printing block $k$ is displaced the distance of one color division, that is, the distance of one screen element from the next, this being, for instance, a red element, and the printing is then repeated, this time with red color; this process of displacing the block and printing is repeated until all colors are printed on the copying screen, the block being each time freshly inked with the appertaining color. In most cases the three colors blue, red and green will be found sufficient.

What I claim is:

1. The steps in the process of making a polychromatic color screen corrected for light distortion effects which consist in passing divergent rays of monochromatic light through a standard polychromatic screen and causing them to immediately impinge on a sensitized photographic film whereby to produce a distorted image of said screen, utilizing the film as a negative and printing therethrough with parallel rays of light on a block having a sensitive photographic surface, treating the block to form a printing block, and printing from said block in monochrome on screen material to form the corrected screen.

2. The steps in the process of making a polychromatic color screen corrected for light distortion effects which consist in passing divergent rays of monochromatic light through a standard polychromatic screen and causing them to immediately impinge on a sensitized photographic film whereby to produce a distorted image of said screen, utilizing the film as a negative and printing therethrough with parallel rays of light on a block having a sensitized photographic surface, treating the block to form a printing block, and printing from said block on screen material in successive monochrome colors with each successive color displaced on the screen material with respect to the preceding color.

In testimony whereof I affix my signature.

FRANZ PILLER, JUNIOR.